United States Patent Office.

IMPROVED DRYER FOR PETROLEUM AND HEAVY OILS.

SAMUEL F. ROGERS, OF MALDEN, MASSACHUSETTS.

Letters Patent No. 60,558, dated December 18, 1866; antedated December 12, 1866.

*The Schedule referred to in these Letters Patent and making part of the same.*

TO ALL WHOM IT MAY CONCERN:

Be it known that I, SAMUEL F. ROGERS, of Malden, in the county of Middlesex, and State of Massachusetts, have invented a new Dryer for Crude Petroleum, or for the Heavy Oils made therefrom; and I do hereby declare that the following is a description of my invention sufficient to enable those skilled in the art to practise it.

This invention consists of a compound composed of the ingredients about in the proportions stated, or their equivalents, which operates on crude petroleum, or on heavy petroleum oils, as a "dryer," and enables the crude petroleum or the heavy oils produced therefrom, to be used for paint, or to mix with paint. In the composition of this dryer, I make use of a material known to dealers in resins as almost worthless, and having little market value, and designated "clay gum," probably from its outside appearance, which resembles lumps of dry clay, though displaying generally, on fracture, more or less resin, probably copal. The other ingredients used are all well known, being linseed oil, red lead, litharge, black oxide of manganese, sulphate of zinc, and benzole. To make one barrel of my dryer, requires the consumption of the above materials, in the proportions substantially as follows, though these proportions may be varied to some extent: Of the resin known as "clay gum," fifty pounds; of raw linseed oil, ten gallons; of red lead, ten pounds; of litharge, ten pounds; of black oxide of manganese, thirty pounds; of sulphate of zinc, one pound; and of benzole of sixty degrees, thirty gallons. To mix these ingredients so as to form the dryer, proceed as follows: Fuse twelve and a half pounds of resin ("clay gum") in a copper kettle, and when well melted, add two quarts of the linseed oil. When these are well mixed, pour from the kettle into an iron pan, taking care that the heat of the mixture is maintained therein. Proceed to melt more resin ("clay gum") and oil as described, till all the resin is melted, incorporated with oil, and deposited in the heated pan. While the fusing of the resin and mixing it with oil are in progress, heat eight gallons of oil in an iron pan which will hold sixty gallons, by bringing the heat steadily up to the boiling point of the oil, and when at such heat, add the red lead, the litharge, the sulphate of zinc, and the manganese, to the amount before specified, taking care to stir constantly while adding, and continue to agitate till these drying substances are perfectly incorporated with the oil. Then add to the contents of this pan the prepared resin ("clay gum") and oil, taking care that the contents of the two pans are of the same temperature, and stir the whole till thoroughly united. While thus stirring, increase the heat till the thoroughly mixed contents of the sixty-gallon pan will "silk" finely, and then draw the fire and lower the heat until the benzole can be added without much evaporation thereof, agitating the contents of the pan smartly all the while. When well mixed, dip out the contents of the pan and strain them.

I claim the within-described petroleum dryer, constituted substantially as set forth.

SAMUEL F. ROGERS.

Witnesses:
J. B. CROSBY,
S. B. KIDDER.